United States Patent
Hendin et al.

(10) Patent No.: US 9,912,556 B1
(45) Date of Patent: Mar. 6, 2018

(54) DISPLAYING OF NETWORK DEVICE STATUS

(71) Applicant: Google Inc., Mountain View, CA (US)

(72) Inventors: Neil Hendin, Mountain View, CA (US); Jonathan Huang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 14/322,804

(22) Filed: Jul. 2, 2014

(51) Int. Cl.
*G06F 15/173* (2006.01)
*H04L 12/26* (2006.01)

(52) U.S. Cl.
CPC ............ *H04L 43/065* (2013.01); *H04L 43/08* (2013.01)

(58) Field of Classification Search
CPC ....... H04L 43/06; H04L 43/065; H04L 43/08; H04L 43/0805; H04L 43/0811
See application file for complete search history.

(56) References Cited

U.S. PATENT DOCUMENTS

| | | |
|---|---|---|
| 5,613,873 A | 3/1997 | Bell, Jr. |
| 8,044,815 B2 | 10/2011 | Du et al. |
| 8,082,368 B2 | 12/2011 | Hsu et al. |
| 8,103,801 B1 | 1/2012 | Sardella et al. |
| 8,351,868 B2 | 1/2013 | Garra et al. |
| 8,421,644 B2 | 4/2013 | Zhang |
| 8,421,647 B2 | 4/2013 | Kobraei et al. |
| 8,432,278 B2 | 4/2013 | Slepov |
| 8,436,749 B2 | 5/2013 | Lillis et al. |
| 8,567,992 B2 | 10/2013 | Lo et al. |
| 2005/0210123 A1* | 9/2005 | Wang ........... H04L 41/0253 709/218 |
| 2007/0049127 A1* | 3/2007 | Nordin ........... H04Q 1/136 439/676 |
| 2008/0030362 A1* | 2/2008 | Huang ........... H04L 41/0681 340/815.45 |
| 2011/0267191 A1* | 11/2011 | Slepov ........... H04L 49/40 340/540 |
| 2013/0265882 A1* | 10/2013 | Li ........... H04L 43/0805 370/241 |

* cited by examiner

*Primary Examiner* — Glenford Madamba
(74) *Attorney, Agent, or Firm* — Faegre Baker Daniels LLP

(57) ABSTRACT

Aspects of the subject technology relate to displaying of a status of a network device. A performance of a preset sequence of actions can be initiated, where the preset sequence of actions includes a first action. A determination can be made as to whether the first action is performed successfully. Characteristics of the light sources can be set based on the determination of whether the first action is performed successfully.

14 Claims, 6 Drawing Sheets

Both OFF

Left Blink
Right OFF

Left ON
Right OFF

Left OFF
Right Blink

Left OFF
Right ON

Left Blink
Right ON

Both ON

Left ON
Right Blink

Both Blink

BX------

B-X-----

B--X----

B---X---

B----X--

B-----X-

B------X

DISPLAYING OF NETWORK DEVICE STATUS

TECHNICAL FIELD

The present disclosure generally relates to network devices, and, in particular, for example, to displaying of network device status.

BACKGROUND

Network connectivity problems often create issues for users ranging from malfunction of applications (e.g., web browser and email) to complete loss of connectivity. The network connectivity problems may originate from one or more devices within a local area network in a user's home, which may include a modem, a router, and a client device (e.g., cell phone, tablet computer). Alternatively or in addition, the network connectivity problems may come from outside the local area network, such as problems due to internet service providers and online service providers.

SUMMARY

Aspects of the subject technology relate to a network device. The network device includes a plurality of light sources. The network device also includes one or more processors and a non-transitory computer-readable medium including instructions stored therein, which, when executed by the one or more processors, cause the one or more processors to perform operations. The operations include initiating performance of a preset sequence of actions. The preset sequence of action includes a first action, where the first action may be associated with a first display configuration of the plurality of light sources. The operations further include determining whether the first action is performed successfully. The operations further include setting, based on whether the first action is performed successfully, the first display configuration of the plurality of light sources. In some implementations, at least one action in the preset sequence of actions is configured to be performed without network interaction of the network device with another device.

Aspects of the subject technology also relate to a computer-implemented method. The method includes initiating performance of a preset sequence of actions in a network device. The preset sequence of action includes a first action, where the first action may be associated with a first display configuration of a plurality of light sources. The method further includes determining whether the first action is performed successfully. The method further includes setting, based on whether the first action is performed successfully, the first display configuration of the plurality of light sources. In some implementations, at least one action in the preset sequence of actions is configured to be performed without network interaction of the network device with another device.

Aspects of the subject technology also relate to a non-transitory machine-readable medium including instructions stored therein, which when executed by a machine, cause the machine to perform operations. The operations include initiating performance of a preset sequence of actions. The preset sequence of action includes a first action, where the first action may be associated with a first display configuration of a plurality of light sources. The operations further include determining whether the first action is performed successfully. The operations further include setting the plurality of light sources to the first display configuration when the first action is not performed successfully. In some implementations, at least one action in the preset sequence of actions is configured to be performed without network interaction of the network device with another device.

The description in this summary section may provide some illustrative examples of the disclosure. This section is not intended to be a broad overview or to identify essential elements of the disclosure.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
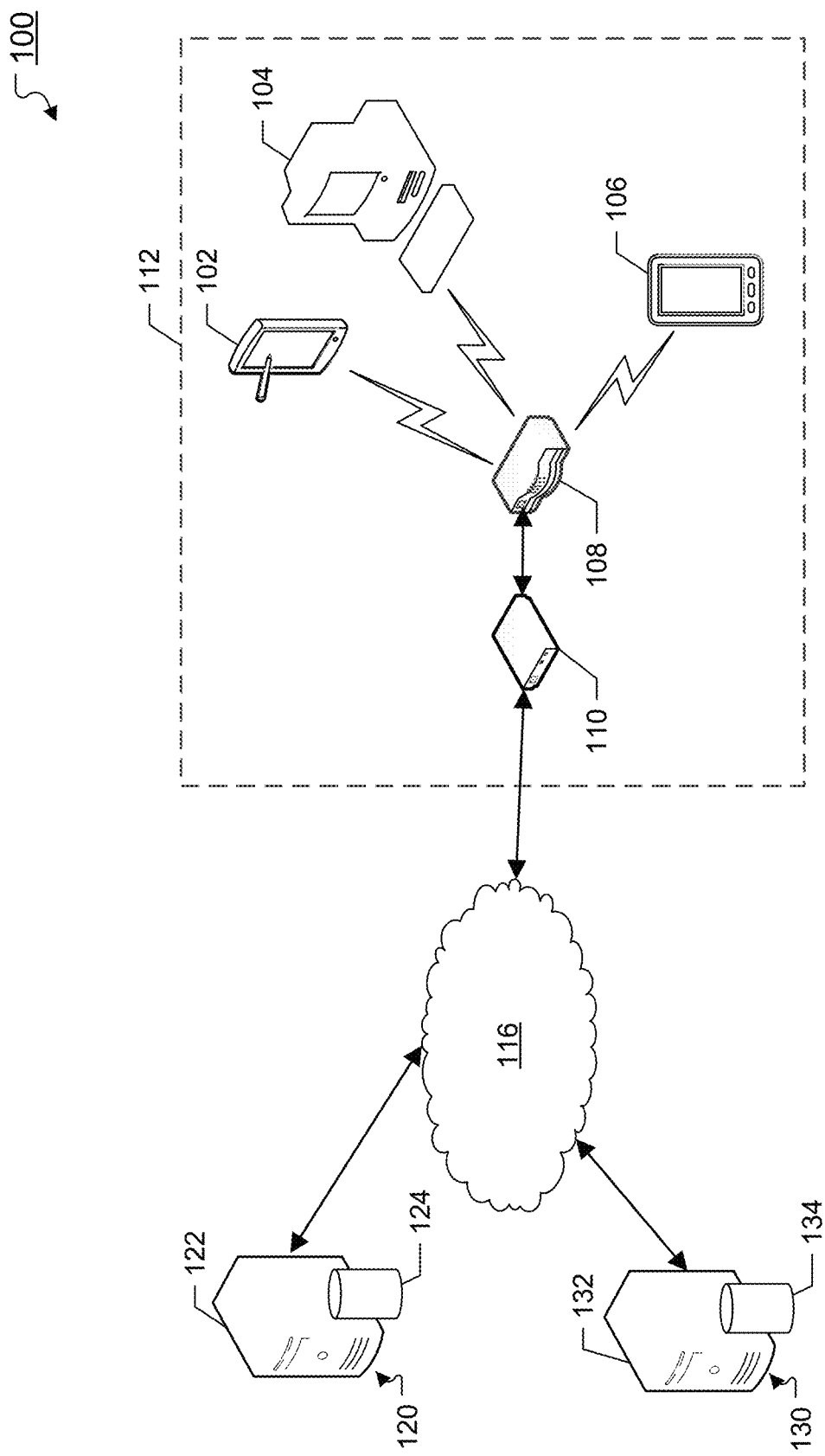
FIG. 1 illustrates an example network environment in which some implementations of the subject technology can be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A user may have access to a wide area network (e.g., the Internet) by connecting one or more client devices (e.g., wireless client devices) to one or more servers on the wide area network via one or more intermediate devices and networks. A client device may be connected to a local area network that is configured to communicate with servers on the wide area network via an access network. The local area network may include one or more client devices connected to the local area network through the access point and/or through a router. The local area network may be connected with the access network via a broadband modem. The wide area network may include one or more servers, such as authentication servers, web servers, electronic messaging servers, and so forth, that may be accessible to the client devices.

With the various devices and networks, users may find it difficult to locate and diagnose a source of a network connectivity problem encountered by any given device. For example, when a client device encounters a network connectivity problem (e.g., the client device cannot connect to a web page), the user may find it difficult to determine whether the network connectivity problem is due to a malfunction or defect in the client device itself, a router with which the client device communicates, and/or a modem with which the router communicates, among other possible sources of network connectivity problems. The user may need to perform several steps to analyze the problem, such as calling the internet service provider, reconfiguring the broadband modem, and/or restarting the internet connection.

Providing an indication that an action performed on a device, such as a modem or a router, was unsuccessful can be challenging if the device does not have a display (e.g., a monitor) or audio features. Addition of a display or audio features may be undesirable due to practicality and/or cost of providing such features for the device. The ability to display a variety of information about a status of the device can be useful, such as in diagnosing boot up failures.

The subject technology provides displaying of a status for a network device. In one or more implementations, the network device can have light sources, where each of these light sources can have one or more adjustable characteristics. By way of non-limiting example, characteristics of a light source can include on or off state, color, and blinking rate of the light source. For example, at a given moment in time, a combination of which light sources of the network device are in an on state, which light sources are in an off state, and/or which light sources are blinking can provide a status of the network device. The network device can set the characteristics for the light sources (e.g., via one or more light source controllers), where a particular combination of characteristics exhibited by the light sources is referred to herein as a "display configuration". A particular combination of characteristics exhibited by a light source is referred to herein as a "state" of the light source. Each light source may be a light-emitting diodes (LED) or a laser, among other devices that may emit light.

In one or more implementations, the network device can be configured to initiate performance of a preset sequence of actions. Each action of the preset sequence of actions may be associated with a display configuration of the light sources of the network device. In initiating performance of the preset sequence of actions, the network device can be configured to perform an action in the preset sequence of actions and determine whether the action is performed successfully. Based on whether the action is performed successfully, the network device can be set to a display configuration associated with the action. The network device can be configured to continue performance of the preset sequence of actions by performing a next action in the preset sequence of actions if the preceding action was performed successfully.

In one or more implementations, actions performed in the preset sequence of actions can facilitate determination of where (e.g., at which device) a network connectivity problem may originate. In some aspects, the preset sequence of actions can be (or can be a part of) a boot up phase of the network device, which may also be referred to as a startup phase or initialization phase. The boot up phase of the network device can be initiated when the network device is turned on or when the network device is set (e.g., instructed by a user, the network device itself, or another device) to perform diagnostics for example.

By way of non-limiting example, the network device can be a hub, a router, a switch, a bridge, a modem, or an access point. For example, the network device may be a broadband modem, such as a cable modem, fiber modem, or digital subscriber line (DSL) modem. The network device may also be a combination of devices, such as a home WiFi router that can comprise a combination of a router, a switch, and an access point. The network device can be a wireless router with a built-in modem (e.g., cable modem) for example. Other network devices can also be utilized in some implementations of the subject technology.

FIG. 1 illustrates an example network environment 100 in which some implementations of the subject technology can be implemented. The network environment 100 includes a local area network 112 that can be communicably connected to servers 120 and 130 via a wide area network 116. The local area network 112 includes computing devices 102, 104, and 106 (hereinafter "102-106"), a router 108, and a modem 110. The local area network 112 may be connected with the wide area network 116 via the modem 110. The local area network 112, the wide area network 116, the various devices within the networks 112 and 116, and various devices (e.g., devices of servers 120 and 130) communicably connected with these networks 112 and 116 and devices, may establish wired connections, wireless connections, or a combination thereof. In some aspects, the local area network 112 is a wireless local area network (WLAN). In some aspects, the local area network 112 is a WLAN within a user's home that is configured to communicably connect to the Internet. The computing device 102 may be a tablet computer configured to connect wirelessly to the router 108 whereas the computing device 104 may be a desktop computer configured to be connected to the router 108 via a wire (e.g., Ethernet wire). In FIG. 1, the network environment 100 is illustrated as including multiple computing devices 102-106, one router 108, one modem 110, and two servers 120 and 130. The number of each of these systems and devices can be fewer or more than that shown in FIG. 1. The wide area network 116 generally includes a number of systems and devices (not shown).

Each of the computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices. Computing devices 102-106 may be provided access to or receive application software executed or stored on any of the other computing devices 102-106.

In some aspects, the computing devices 102-106 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), Single-carrier Frequency Division Multiple Access (SC-FDMA), or Orthogonal FDMA (OFDMA), among others. For example, the communication may occur through a radio-frequency transceiver (not shown). In addition, short-range communication may occur, for example, using a Bluetooth, WiFi, or other such transceiver.

Servers 120 and 130 can include one or more computing devices 122 and/or 132 and one or more computer-readable storage devices 124 and/or 134 (e.g., one or more databases). Each of the servers 120 and 130 may be a system or device having a processor, a memory, and communications capability for providing content and/or service to electronic devices (e.g., 102-106). In some example aspects, each of the servers 120 and 130 can be a single computing device, for example, a computer server. In other embodiments, each of the servers 120 and 130 can represent more than one computing device working together to perform the actions of a server computer (e.g., cloud computing). Further, each of the servers 120 and 130 can represent various forms of servers including, but not limited to, an application server, a proxy server, a network server, an authentication server, an electronic messaging server, or a server farm, accessible to the computing devices 102-106. For example, the server 120 may be an internet service provider server that provides services for accessing and/or using the wide area network 116. The server 130 may be a web server that delivers web content accessible through the wide area network 116.

In some aspects, the local area network 112 can include, but is not limited to, a computer network that covers a limited geographic area (e.g., a home, school, computer laboratory, or office building) using a wired and/or wireless distribution method (e.g., spread-spectrum or OFDM). In a wireless setting for example, the local area network 112 can link one or more client devices (e.g., computing devices 102-106) using a wireless distribution method (e.g., WiFi Direct). Such a wireless local area network 112 can connect client devices (e.g., the computing devices 102-106) to the wide area network 116 through a wireless router (e.g., router 108) using WiFi standards (e.g., IEEE 802.11).

In some aspects, the wide area network 116 can include, but is not limited to, a large computer network that covers a broad area (e.g., across metropolitan, regional, national, or international boundaries), for example, the Internet, a private network, a cellular network, or a combination thereof connecting any number of mobile clients, fixed clients, and servers. Further, the wide area network 116 can include, but is not limited to, any one or more of the following network topologies, including a bus network, a star network, a ring network, a mesh network, a star-bus network, a tree or hierarchical network, and the like. In some aspects, communication between each client (e.g., computing devices 102-106) and server (e.g., servers 120 and 130) can occur via a virtual private network (VPN), Secure Shell (SSH) tunnel, or other secure network connection. The wide area network 116 may include one or more wired or wireless network devices that facilitate device communications between the computing devices 102-106 and the servers 120 and 130, such as switch devices, router devices, relay devices, and so forth, and/or may include one or more servers. The wide area network 116 can include an access network that can be connected to the local area network 112. The access network can include, but is not limited to, a cable access network, public switched telephone network, and/or fiber optics network that can be connected to the local area network 112 (e.g., connected to the modem 110).

A user may interact with a system, hosted by servers 120 and 130, through a client application installed at the computing devices 102-106. Alternatively, the user may interact with the system through a web based browser application at the computing devices 102-106. Communication between the computing devices 102-106 and the system, and/or one or more services, may be facilitated through the router 108 and the modem 110 of the local area network 112 and/or the wide area network 116.

In example aspects, a user at any of the computing devices 102-106, such as the computing devices 102, may encounter network connectivity problems when trying to access a server (e.g., server 120) connected to the wide area network 116, such as when loading a web page in a web browser on the computing device 102. However, the source of the network connectivity problem(s), which may be within any device or system in the local area network 112, the wide area network 116, and/or the servers 120 and 130, may not be apparent to the user.

Figure 2A:
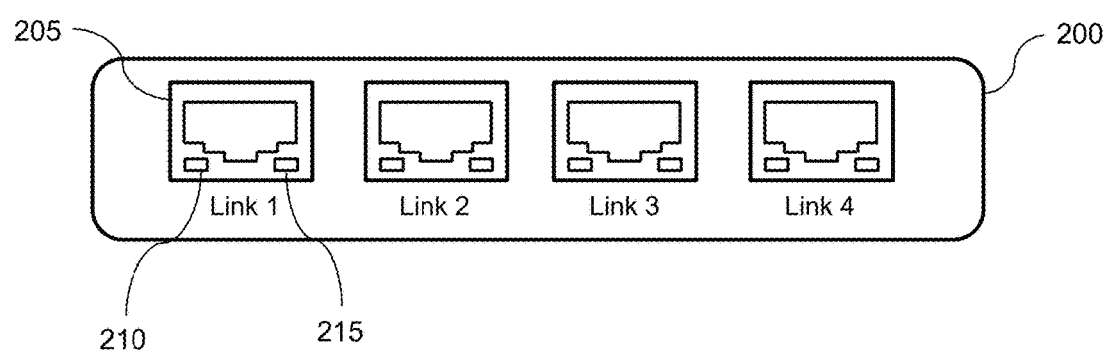
FIG. 2A illustrates an example network device, in accordance with one or more implementations.

FIG. 2A illustrates an example network device 200, in accordance with one or more implementations. The network device 200 may be, by way of non-limiting example, a router (e.g., 108 in FIG. 1), a modem (e.g., 110 in FIG. 1), a modem with a built-in router, a bridge, a hub, a switch, an access point, among other network devices, that can be configured to connect client devices (e.g., computing devices 102-106 in FIG. 1) to a wide area network (e.g., 116 in FIG. 1). The network device 200 includes input/output (I/O) ports (e.g., 205), where each I/O port can include light sources (e.g., 210 and 215). The network device 200 can include one or more light source controllers (not shown) configured to control a state of the light sources.

In one or more implementations, the light sources in the input/output (I/O) ports of the network device 200 can be configured to provide the display configuration of the network device 200. The I/O ports may be Ethernet ports of the network device 200 for example, where an Ethernet port generally has two built-in light sources (e.g., LEDs) that are utilized to display a link status of the Ethernet port. Alternatively or in conjunction, a network device can have a lightbar with light sources that display statuses of the I/O ports.

Figure 2B:
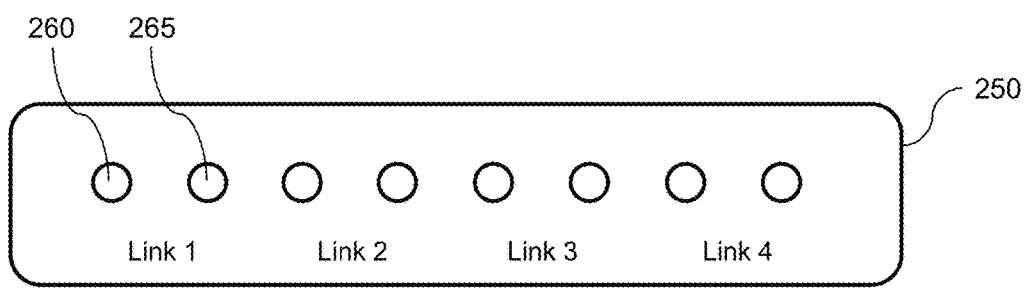
FIG. 2B illustrates an example network device with a lightbar that includes light sources, in accordance with one or more implementations.

FIG. 2B illustrates an example network device 250 with a lightbar that includes light sources, in accordance with one or more implementations, where a pair of light sources (e.g., 260, 265) is associated with one I/O port (not shown). The pair of light sources is not in the I/O ports. In some aspects, FIG. 2A and FIG. 2B may show a first side (e.g., front side) and a second side (e.g., back side), respectively, of the same network device.

Figure 3:
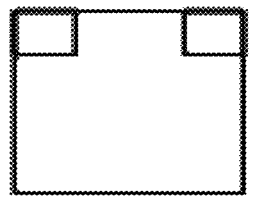
FIG. 3 shows display configurations of an example port of a network device that includes two built-in light sources.
Figure 3:
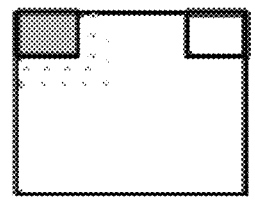
Figure 3:
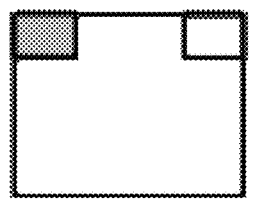
Figure 3:
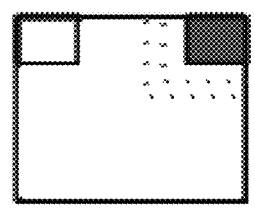
Figure 3:
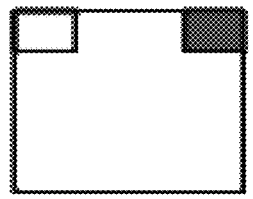
Figure 3:
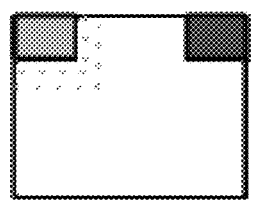
Figure 3:
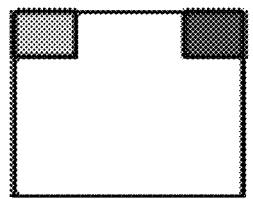
Figure 3:
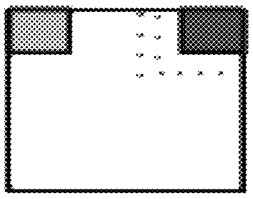
Figure 3:
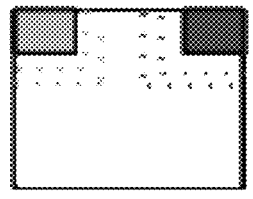

FIG. 3 shows display configurations of an example port (e.g., 205) of a network device (e.g., 200) that includes two built-in light sources (e.g., LEDs). In particular, the network device includes a left built-in light source and a right built-in light source. Each light source can be configured to be one of three states: on, off, or blinking. Accordingly, at a given moment in time, the port can exhibit one of the nine display configurations shown in FIG. 3. In some aspects, as shown in the example of FIG. 3, the left light source, when on or blinking, is fixed to a single color (e.g., green), and the right light source, when on or blinking, is fixed to another color (e.g., amber). In other aspects, the left light source and the right light source may be of the same fixed color when on or blinking. Although two light sources are shown, the port may be designed to include fewer than or more than two light sources.

In one or more implementations, the port of FIG. 3 can be configured with more than the nine display configurations shown in FIG. 3, without increasing the number of light sources in the port. For example, one or both of the light sources can be operable to exhibit one of multiple colors and/or one of multiple blink rates. In some aspects, a blink rate of one of the light sources may be set to be different from a blink rate of the other light source.

In some aspects, one or both of the light sources may be configurable to change color. For example, a state of a light source can involve alternating between different colors. The state of a light source can involve a repeating sequence of changing from purple to green after two seconds, changing from green to blue after another three seconds, and changing from blue to purple after another one second.

As another example, in accordance with one or more implementations, the port may be an Ethernet port of the network device. In such a case, a first light source may generally provide a speed indicator that indicates in which type of connection (e.g., 10 Mbps, 100 Mbps) the Ethernet port is operating by using one color (e.g., green) to indicate one type of connection and another color (e.g., amber) to indicate another type of connection. A second light source may generally provide an activity indicator that indicates whether a network link has been established with the Ethernet port. The second light source may be capable of providing a single color (e.g., green). The first and second light sources together provide a link status of the Ethernet port. In some aspects, the network device can include light sources associated with Ethernet ports and can configure the light sources to display a link status of the Ethernet ports during operation of the network device subsequent to a successful boot up phase of the network device.

Other combinations of different characteristics of the light sources are possible and would lead to additional possible display configurations beyond the nine display configurations shown in FIG. 3. With each possible degree of freedom in the characteristics of a light source, the number of possible states of the light source can increase. As the number of possible states of the light source increases, the number of possible display configurations of the network device can also increase.

Figure 4:
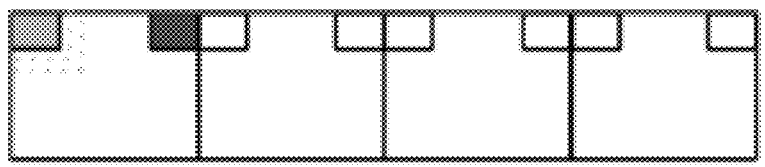
FIG. 4 illustrates example display configurations exhibited by light sources of a network device, in accordance with one or more implementations.
Figure 4:
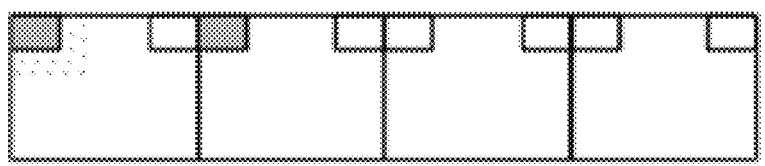
Figure 4:
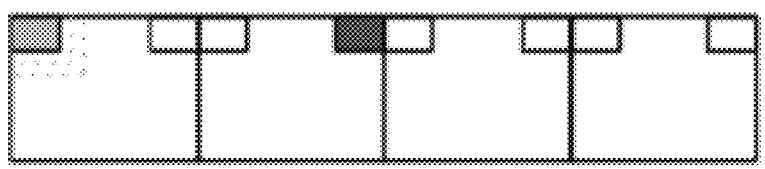
Figure 4:
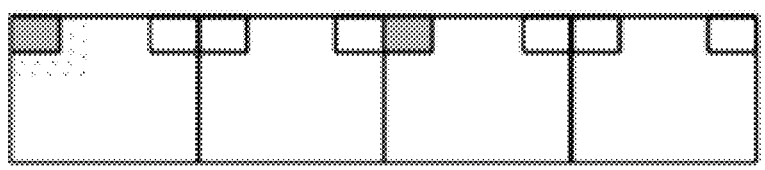
Figure 4:
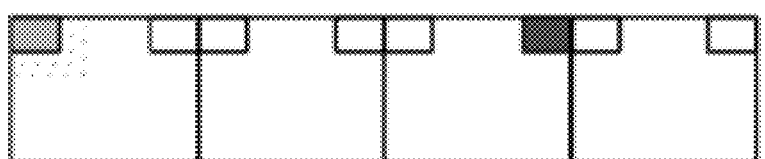
Figure 4:
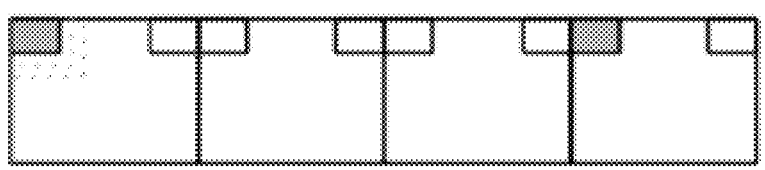
Figure 4:
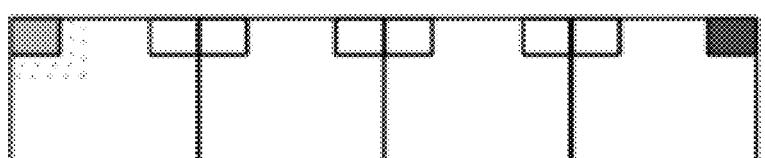

FIG. 4 illustrates example display configurations exhibited by light sources of a network device, in accordance with one or more implementations. In particular, FIG. 4 illustrates the display configurations shown in Table 1, which provides an example lookup table that maps display configurations to a status associated with an action that is performed unsuccessfully. For example, Table 1 may be associated with a router (e.g., 108 in FIG. 1), and each light source may be associated with an I/O port of the router. In Table 1, an 'X' indicates a light source that is on, a '-' indicates a light source that is off, and a 'B' indicates a light source that is blinking. A blinking light source can be considered a light source that, from a visual perspective, alternates between appearing to be off and appearing to be on. A network device with at least eight light sources can be operable to display the display configurations shown in Table 1.

TABLE 1

Lookup table mapping display configuration to status of network device

| Display configuration | Status |
| --- | --- |
| BX------ | Bootloader failed |
| B-X----- | Kernel failed |
| B--X---- | Root filesystem failed |
| B---X--- | Could not connect to cable/DSL modem (e.g., upstream modem failed) |
| B----X-- | Could not successfully reach external hosts by IP number (e.g., IP connectivity failed) |
| B-----X- | Could not successfully reach external hosts by name (e.g., DNS lookup failed) |
| B------X | External hosts could not reach this router from the Internet |

In one or more implementations, Table 1 can be a lookup table provided for a boot up phase of a network device (e.g., 200 in FIG. 2A). The network device can initiate performance of the boot up phase. With reference to FIG. 2A, during the boot up phase of the network device 200, the network device 200 can configure, also referred to as program, the I/O ports (e.g., 210, 215) to display a status of the boot up phase of the network device 200. If all actions of the boot up phase are performed successfully, the network device 200 can exit the boot up phase and configure/program the light source(s) of respective I/O ports to display respective link statuses of the I/O ports. Each action performed by the network device in the boot up phase can be associated with a display configuration. For example, a first action can include a loading a bootloader, which can be associated with the display configuration "BX------".

In a case where a failure occurred during the boot up phase, a user of the network device can observe and utilize the display configuration of the network device to determine which action of the boot up phase failed. For example, if the loading of a bootloader is unsuccessful, the display configuration of "BX------" can be displayed by the network device. The user can determine which action failed by looking up the display configuration in a lookup table, where the lookup table can be in a manual or reference card, either electronic or physical versions, provided with the network device for example. The user can consult the reference card, manual, the lookup table itself, or other reference material to determine how, or if, the user can fix the problem.

As shown in Table 1, the boot up phase can include actions that can be performed without network interaction of the network device with another device, such as operations of the network including, by way of non-limiting example, loading a bootloader, loading a kernel, and loading a root filesystem. Such operations can be referred to as internal operations of the network device.

The boot up phase can also include actions that may involve network interaction of the network device with another device, such as testing to determine whether the network device can successfully connect to a modem (e.g., 110 in FIG. 1) or successfully reach (e.g., establish a connection) with an external host by Internet Protocol (IP) number or by domain name. The external host may be an internet service provider server (e.g., server 120 and/or 130 in FIG. 1). For example, as part of the boot up phase, the network device can be configured to ping a preset IP number, which may be set to an IP number of a manufacturer of the network device or an IP number of an internet service provider server. In response to the pinging, the external host can attempt to reach the network device.

In a case with fewer than eight light sources and the same statuses as shown in Table 1, the display configurations can be adapted to utilize the number of light sources in the network device. Table 2 shows an example lookup table in a case with six light sources.

TABLE 2

Alternate lookup table

| Display configuration | Status |
|---|---|
| -X---- | Bootloader failed |
| --X--- | Kernel failed |
| -XX--- | Root filesystem failed |
| ---X-- | Could not connect to cable / DSL modem (e.g., upstream modem failed) |
| -X-X-- | Could not successfully reach external hosts by IP number (e.g., IP connectivity failed) |
| --XX-- | Could not successfully reach external hosts by name (e.g., DNS lookup failed) |
| -XXX-- | External hosts could not reach this router from the Internet |

As shown in Table 2, even for the same set of statuses as those shown in Table 1 above, a network device can be configured with a different set of display configurations. Furthermore, in Table 2, some of the light sources may be in an off state in all the display configurations. Other statuses and corresponding actions aside from those shown in Tables 1 and 2 are possible. Fewer, more, and/or different statuses and corresponding actions than those shown in Tables 1 and 2 can be utilized. For example, a lookup table can include more statuses than those in Tables 1 and 2 to allow for finer tuning in detecting a possible origin of a network connection problem. Furthermore, the actions corresponding to the statuses in Tables 1 and 2 can include a first subset of actions and a second subset of actions. For example, the first subset of actions may include loading a bootloader, loading a kernel, and loading a root filesystem whereas the remaining actions are part of the second subset of actions. Alternatively, the boot up phase associated with Tables 1 and 2 can a subset of another boot up phase.

Figure 5:
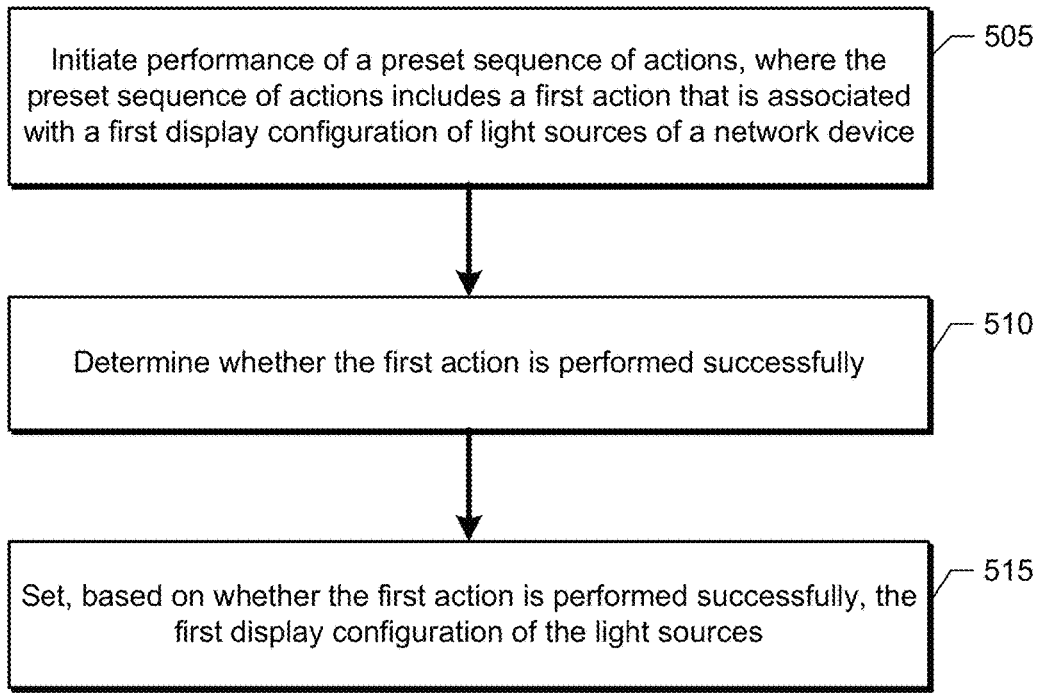
FIG. 5 shows a flow diagram illustrating an example process for displaying a status for a network device, in accordance with various aspects of the subject technology.

FIG. 5 shows a flow diagram illustrating an example process 500 for displaying a status for a network device (e.g., 200 in FIG. 2), in accordance with various aspects of the subject technology.

As set forth in step 505 in FIG. 5, the network device can initiate performance of a preset sequence of actions. The preset sequence of actions includes a first action that is associated with a first display configuration of the light sources of the network device. In some aspects, the preset sequence of actions may be performed as a boot up phase or as part of a boot up phase of the network device and may be associated with a lookup table (e.g., Table 1) that maps a status of the network device with a corresponding display configuration. With reference to Table 1, the first action is to load a bootloader and is associated with a display configuration "BX------".

As set forth in step 510 in FIG. 5, the network device can determine whether the first action is performed successfully.

As set forth in step 515 in FIG. 5, the network device can set the light sources to the first display configuration based on whether the first action is performed successfully. In some aspects, the light sources are set to the first display configuration if the first action is not performed successfully.

With reference to Table 1, the light sources are set to the first display configuration if the loading of the bootloader is not performed successfully.

Figure 6:
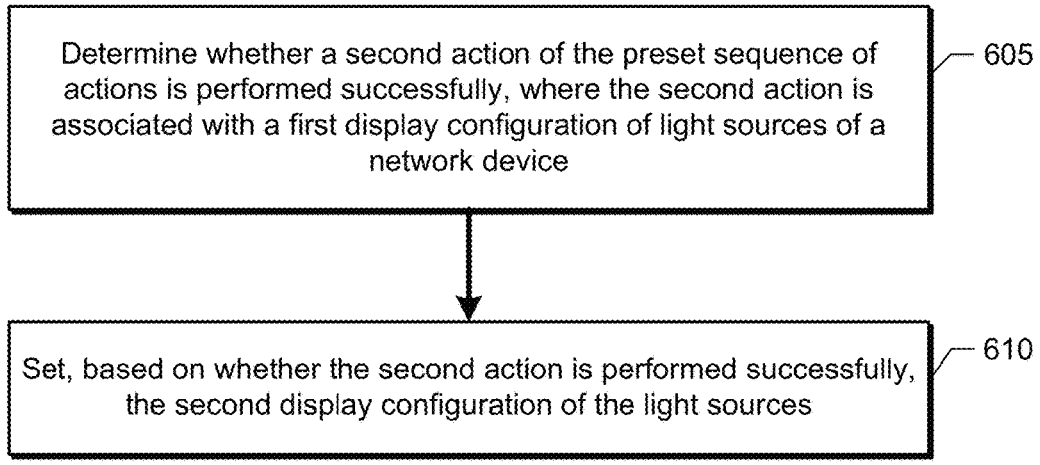
FIG. 6 shows a flow diagram illustrating an example process for displaying a status for a network device in relation to a second action in a preset sequence of actions, in accordance with various aspects of the subject technology.

FIG. 6 shows a flow diagram illustrating an example process 600 for displaying a status for a network device (e.g., 200 in FIG. 2) in relation to a second action in a preset sequence of actions, in accordance with various aspects of the subject technology.

As set forth in step 605 in FIG. 6, the network device can continue performance of the preset sequence of actions and determine whether a second action in the preset sequence of actions is performed successfully. With reference to Table 1, the second action is to load a kernel and is associated with a second display configuration "B-X------".

As set forth in step 610 in FIG. 6, the network device can set the light sources to the second display configuration based on whether the second action is performed successfully. In some aspects, the light sources are set to the second display configuration if the second action is not performed successfully. With reference to Table 1, the light sources are set to the second display configuration if the loading of the kernel is not performed successfully.

In one or more implementations, the process 600 shown in FIG. 6 can also be utilized for actions subsequent to the second action. For a boot up phase, each action of the boot up phase can be performed one after another until an action fails or until all actions of the boot up phase have been performed successfully. If an action fails, the network device may attempt to perform the action a preset number of times until the action is performed successfully. If the action fails after being performed the preset number of times, the network device may be set to provide a display configuration to indicate the error.

In one or more implementations, the light sources may be part of or associated with I/O ports (e.g., Ethernet ports) of the network device. If all actions of the boot up phase are performed successfully, the network device can exit the boot up phase and configure the light source(s) of respective I/O ports to display respective link statuses of the I/O ports.

In a case when a failure occurs during the boot up phase, a user of the network device can observe and utilize the display configuration of the network device to determine which action of the boot up phase failed. The user can determine which action failed by looking up the display configuration in a lookup table, where the lookup table can be in a manual or reference card, either electronic or physical versions, provided with the network device for example. The user can consult the reference card, manual, the lookup table itself, or other reference material to determine how, or if, the user can fix the problem.

With reference to Table 1, as an example, if the light sources display the first display configuration ("BX------") to signify that the loading of the bootloader is not performed successfully, the user can determine that a network issue is likely a result of a malfunction or defect in the network device itself and not due to a defect in, for example, a modem connected with the network device or an internet service provider. The user may then fix the network issue by focusing on the network device itself, such as fixing or replacing the network device. As another example, if the light sources display the fourth display configuration ("B---X---") to signify that connecting to a modem is not performed successfully, the user can determine that the network issue is likely not due to the network device, since the first three actions were performed successfully, but rather is due to the modem. In such a case, the user may determine that the modem itself may be defective, a connection (e.g., Ethernet cable) from the network device to the modem may be defective, or both.

In some aspects, a determination of the display configuration can be aided with a client device of a user, such as a smart phone or a tablet. For example, the network device can have different display configurations that can be provided to a user, and the different display configurations may be difficult to discern by the user's eyes. As an example, a display configuration can cycle through the light sources (e.g., set a blinking rate for the light sources) in a manner too fast for an average human eye but may be detectable/ discernable by the client device. The client device may be capable of more accurately decoding complex display configurations than the user's eye in some cases.

The client device can be configured with an application that can record an image or record a set of images (e.g., a video) and then process the recorded image or images to determine the display configuration at issue. The determination can be made by comparing the image or set of images with a lookup table stored in memory of the client device for example. The client device can provide or otherwise identify to the user the display configuration at issue. Dependent on the client device's settings (e.g., factory settings or user settings), the client device can also provide the user with a recommended course of action or in some cases proceed with performing an action, such as sending an message (e.g., text message) to an Internet provider to report the error.

In one or more implementations, a boot up phase of a network device can be provided as follows. For discussion purposes, the network device can be considered to be a router, although the discussion generally applies also to other network devices. The boot up phase can involve loading a bootloader, where the bootloader is utilized to load an operating system of the router. If successfully loaded, the boot up phase can then involve loading of a kernel of the operating system by the bootloader. When loading the kernel, the router can look for interfaces of the router to which other devices may be connected. As an example, the router may have one or more wireless Ethernet interfaces. The kernel can also locate a storage interface, referred to as a refile system, within which other parts of the operating system are stored.

If the actions within the router itself have been performed successfully, the router may check, as part of the boot up phase, its ability to connect one or more client devices (e.g., laptop, cell phone) to a wide area network (e.g., the Internet). The router can ping a preset IP number of an external host (e.g., server 120 in FIG. 1). The router can also ping a preset domain name of an external host, in which case the router can perform a domain name lookup and provide an IP number. Alternatively or in conjunction, the router can ping a device, by IP number and/or name, within a local area network.

If any of these actions are not performed successfully, the network device can display the display configuration associated with the action that was not performed successfully. For example, when loading the kernel, the network device may determine that the kernel is corrupt (e.g., has been tampered with) or is missing. The network device can end performance of the boot up phase and provide a display configuration associated with an unsuccessful loading of the kernel, such as "--X---" in Table 2. As another example, if the kernel is unable to access the refile system, such as if the refile system has been tampered with or is broken, the network device can flag that as a refile system error and provide a display configuration associated with a refile system error.

In some cases, the router may be able to ping a host by IP number but not by name, even if the pinging is performed with the same host. In these cases, the router can indicate to the user of a domain name system (DNS) error via a corresponding display configuration, which may indicate to the user that a setup of the domain lookup of the router might not be correct. The user can attempt to fix the problem by adjusting the router configuration.

In one or more implementations, a display configuration can be provided on the light sources as a corresponding action is performed and transition to a next display configuration when a next action is performed. For example, with reference to Table 1, the light sources may provide the display configuration "BX------" when the bootloader is being loaded and transition to the display configuration "B-X------" after the bootloader is loaded successfully and the kernel is being loaded. If the bootloader is not loaded successfully, the display configuration may remain at "BX------".

In one or more implementations, the light sources may be configured to provide a different set of display configurations when performing an action versus when the action is not performed successfully. The first light source in Table 1 may be set to blinking only when an action is not performed successfully. For example, with continued reference to Table 1, the light sources may provide the display configuration "-X------" when the bootloader is being loaded and transition to the display configuration "--X-----" after the bootloader is loaded successfully and the kernel is being loaded. If the bootloader is not loaded successfully, the display configuration may be set to "BX------". If the kernel is not loaded successfully, the display configuration may be set to "B-X-----". The difference of a characteristic of one light source between the display configuration of performing an action and the display configuration when the action is performed unsuccessfully is provided by way of example only. In some aspects, characteristics of more than one light source may differ between the display configuration of performing an action and the display configuration when the action is performed unsuccessfully.

In one or more implementations, during operation of the network device subsequent to a boot up phase, the network device may encounter a network connectivity problem. A user of the network device or the network device itself may provide instructions to run diagnostic tests to determine a source of the network connectivity problem. In some cases, after several attempts to establish a connection between a client device (e.g., 104 in FIG. 1) and a server (e.g., 120 in FIG. 1), the network device may begin running diagnostic tests. For example, the instructions to run diagnostic tests may include rebooting the network device and initiating performance of actions that are the same as or similar to those of the boot up phase. In aspects where the light sources are associated with ports (e.g., I/O ports) of the network device, when the network device is running diagnostic tests, the network device can configure the light sources to be operable to display a status of the network device as opposed to link statuses of the corresponding I/O ports.

In one or more implementations, the network device may be set to periodically reboot and initiate performance of actions that are the same as or similar to those of the boot up phase. The light sources may provide a display configuration for a preset time (e.g., 5 minutes) based on settings by a user or factory settings, after which the network device may reboot and initiate performance of the boot up phase. A user may periodically check the light sources to determine whether the internet connectivity problem persists. For example, a user may be unable to connect a client device to the Internet, and the display configuration of the light sources may indicate that the network service cannot reach the Internet because the internet service provider server is down. Instead of constantly refreshing the client device (e.g., refreshing a web browser) to check if the problem has been resolved or spending time fixing a network device that is not in error, the user may periodically check the display configuration of the light sources to determine a status of the network device.

Although light sources of a network device are shown as being arranged (e.g., positioned) in a single row or column (e.g., FIGS. 2A, 2B, and 4), any given network device can have other arrangements of light sources, in accordance with one or more implementations. For example, the light sources can be arranged as part of an array with multiple rows and columns of light sources. As another example, the light sources can be arranged in a circle, a square, a hexagon, among other possible shapes.

In one or more implementations, a network device can determine a number of light sources that are available and an arrangement of the light sources and, based on the determination, select a lookup table to utilize in displaying a status of the network device. For example, a manufacturer of the network device may have different models for the network device. The manufacturer may have a first model with three ports and six LEDs (e.g., two per port) and a second model with four ports and eight LEDs (e.g., two per port). The network device can determine to which model the network device belongs based on an internally stored model number and/or by auto-detecting the number of ports and arrangement thereof for example. Based on the determination, the network device may select a lookup table to utilize. In displaying a status of a network device, the first model of the network device may be configured to utilize Table 2 whereas the second model of the network device may be configured to utilize Table 1.

Figure 7:
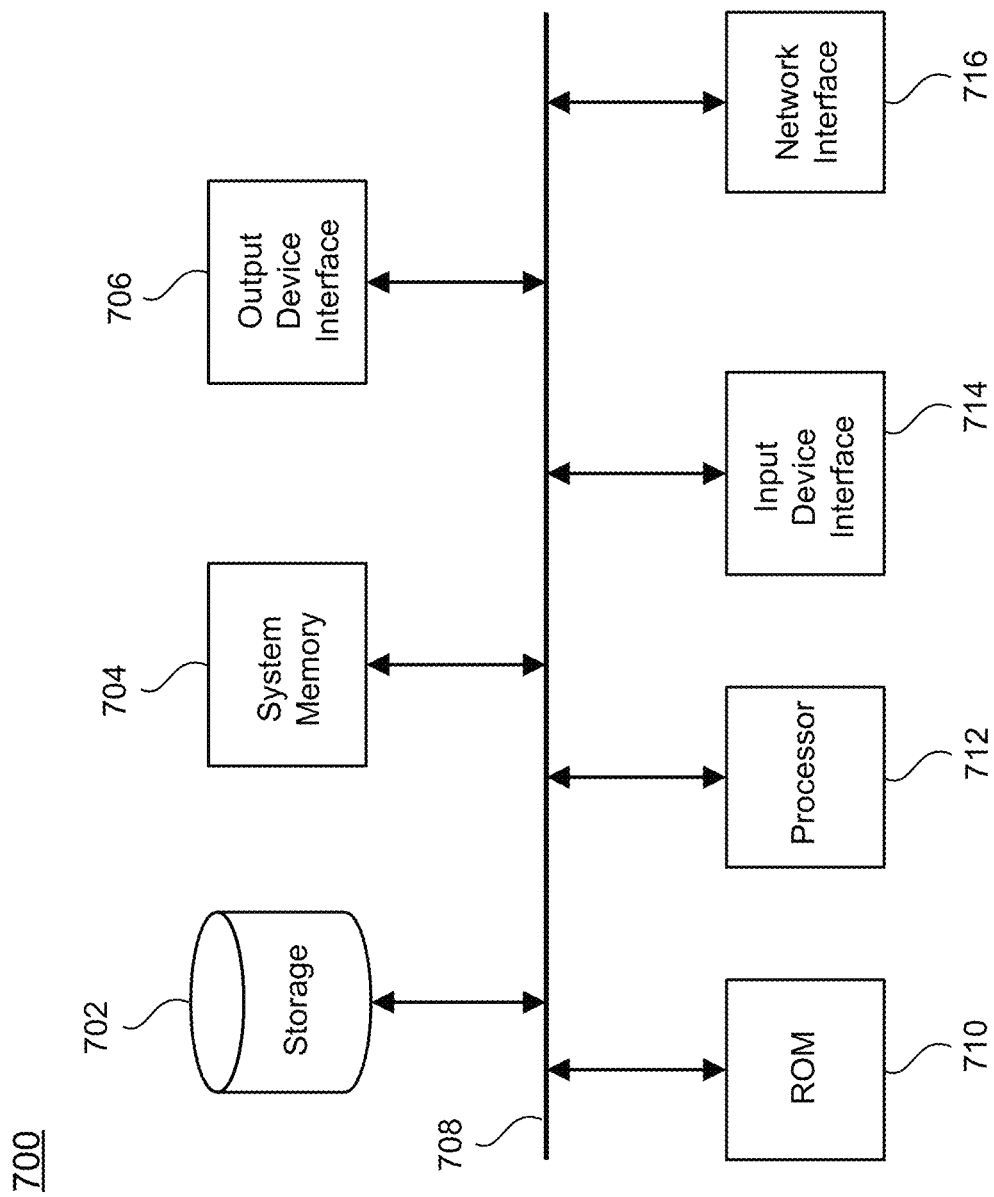
FIG. 7 conceptually illustrates an example electronic system with which some implementations of the subject technology can be implemented.

FIG. 7 conceptually illustrates an example electronic system with which some implementations of the subject technology can be implemented. Electronic system 700 can be a computer, phone, PDA, or any other sort of electronic device. The electronic system 700 can be a network device such as, by way of non-limiting example, a bridge, a switch, a modem, a router, a hub, an access point, or a combination thereof. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 408 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 702.

Other implementations use a removable storage device (for example, a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units include instructions for displaying a status of the electronic system 700, in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, for example, cathode ray tubes (CRT) or liquid crystal displays (LCD). In the case of a network device such as a router or modem, for example, output devices used with output device interface 706 can include light sources connected to or built into the network device. Some implementations include devices, for example, a touchscreen that functions as both input and output devices.

Finally, as shown in FIG. 7, bus 708 also couples electronic system 700 to a network (not shown) through a network interface 716. In this manner, the computer can be a part of a network of computers (for example, a local area network (LAN), a wide area network (WAN), or an Intranet, or a network of networks, for example, the Internet). Any or all components of electronic system 700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a machine or computer. A computer readable medium can be one or more computer readable media and a machine readable medium can be one or more machine readable media. These terms exclude any wireless signals, wired download signals, and any other ephemeral signals.

To provide for interaction with a user, implementations of the subject matter described in this specification can include usage of a computer having a display device, e.g., CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A network device, comprising:
   a plurality of light sources;
   a plurality of input/output (I/O) ports, wherein each of the plurality of I/O ports is associated with at least one of the plurality of light sources;
   one or more processors;
   a machine-readable medium comprising instructions stored therein, which when executed by the one or more processors, cause the one or more processors to perform operations comprising:
      initiating performance of a preset sequence of actions corresponding to an initialization phase of the network device, the preset sequence of actions comprising a first action and a second action, the second action being subsequent to the first action in the initialization phase of the network device,
      wherein the first action comprises at least one of attempting to load a bootloader associated with the network device, attempting to load a kernel associated with the network device, or attempting to load a root filesystem associated with the network device,
      wherein the second action comprises at least one of attempting to reach a host or attempting to receive a communication from the host,
      wherein the first action is associated with a first display configuration of a plurality of display configurations and the second action is associated with a second display configuration of the plurality of display configurations, and wherein each of the plurality of display configurations comprises a respective display characteristic for each of the plurality of light sources which is independent of a status of the respective I/O port;
      determining whether the first action is performed successfully;
      setting, based on whether the first action is performed successfully, the plurality of light sources to the first display configuration of the plurality of display configurations;
      determining whether the second action is performed successfully; and
      setting, based on whether the second action is performed successfully, the plurality of light sources to the second display configuration of the plurality of display configurations,
      wherein:
         the first action of the preset sequence of actions is configured to be performed without network interaction of the network device with another device via at least one of the plurality of I/O ports,
         the second action of the preset sequence of actions is configured to be performed with network interaction of the network device with the another device via at least one of the plurality of I/O ports, and
         at least one display configuration of the plurality of display configurations is indicative of an error being at the another device.

2. The network device of claim 1, wherein the setting comprises setting the plurality of light sources to the first display configuration when the first action is not performed successfully.

3. The network device of claim 1, wherein the operations further comprise:

exiting an initialization phase of the network device when all actions in the preset sequence of actions are performed successfully; and configuring, in response to the exiting, the plurality of light sources to display a link status of each of the plurality of I/O ports.

4. The network device of claim 1, wherein at least one of the plurality of I/O ports is an Ethernet port.

5. The network device of claim 1, wherein the network device is selected from the group consisting of a hub, a router, a switch, a bridge, a modem, or an access point.

6. A computer-implemented method, comprising:

initiating performance of a preset sequence of actions in a network device having a plurality of light sources and a plurality of ports, the preset sequence of actions corresponding to an initialization phase of the network device, the preset sequence of actions comprising a first action and a second action, wherein the first action comprises at least one of attempting to load a bootloader associated with the network device, attempting to load a kernel associated with the network device, or attempting to load a root filesystem associated with the network device, wherein the second action comprises at least one of attempting to reach a host or attempting to receive a communication from the host, wherein the first action is associated with a first display configuration of a plurality of display configurations and the second action is associated with a second display configuration of the plurality of display configurations, the second action being subsequent to the first action in the initialization phase of the network device, each of the plurality of light sources is associated with at least one of the plurality of ports, and wherein each of the plurality of display configurations comprises a respective display characteristic for each of a plurality of light sources which is independent of a status of a respective port;

determining whether the first action is performed successfully;

setting, based on whether the first action is performed successfully, the plurality of light sources to the first display configuration;

determining whether the second action is performed successfully; and setting, based on whether the second action is performed successfully, the plurality of light sources to the second display configuration, wherein:
at least one action of the preset sequence of actions is configured to be performed without network interaction of the network device with another device via at least one of the plurality of ports of the network device,
at least one action of the preset sequence of actions is configured to be performed with network interaction of the network device with the another device via at least one of the plurality of ports, and
at least one display configuration of the plurality of display configurations is indicative of an error being at the another device.

7. The method of claim 6, further comprising:
exiting an initialization phase of the network device when all actions in the preset sequence of actions are performed successfully; and configuring, in response to the exiting, the plurality of light sources to display a status of each of the plurality of ports.

8. The method of claim 6, further comprising:
determining a total number of light sources that compose the plurality of light sources; and
selecting a lookup table from among a plurality of lookup tables based at least on the determined total number of light sources, wherein each lookup table provides a correspondence between an action in the preset sequence of actions and a display configuration of the plurality of display configurations.

9. A non-transitory machine-readable medium comprising instructions stored therein, which when executed by a machine, cause the machine to perform operations comprising:

initiating performance of a preset sequence of actions in a network device having a plurality of light sources and a plurality of ports, the preset sequence of actions corresponding to an initialization phase of the network device, the preset sequence of actions comprising a first action and a second action, wherein the first action comprises at least one of attempting to load a bootloader associated with the network device, attempting to load a kernel associated with the network device, or attempting to load a root filesystem associated with the network device, wherein the second action comprises at least one of attempting to reach a host or attempting to receive a communication from the host, wherein the first action is associated with a first display configuration of a plurality of display configurations and the second action is associated with a second display configuration of the plurality of display configurations, the second action being subsequent to the first action in the initialization phase of the network device, each of the plurality of light sources is associated with at least one of the plurality of ports, and wherein each of the plurality of display configurations comprises a respective display characteristic for each of a plurality of light sources which is independent of a status of a respective port;

determining whether the first action is performed successfully;

setting the plurality of light sources to the first display configuration when the first action is not performed successfully;

determining whether the second action is performed successfully; and setting the plurality of light sources to the second display configuration when the second action is not performed successfully, wherein:
at least one action of the preset sequence of actions is configured to be performed without network interaction of the network device with another device via at least one of the plurality of ports of the network device,
at least one action of the preset sequence of actions is configured to be performed with network interaction of the network device with the another device via at least one of the plurality of ports, and
at least one display configuration of the plurality of display configurations is indicative of an error being at the another device.

10. The non-transitory machine-readable medium of claim 9, the operations further comprising:

exiting an initialization phase of the network device when all actions in the preset sequence of actions are performed successfully; and configuring, in response to the exiting, the plurality of light sources to display a status of each of the plurality of ports.

11. The non-transitory machine-readable medium of claim 9, wherein the display characteristic for at least one of the plurality of light sources comprises on or off state, color, or blinking rate of the at least one of the plurality of light sources.

12. The non-transitory machine-readable medium of claim 9, wherein the operations further comprise setting the plurality of light sources to a second display configuration of the plurality of display configurations when the first action is being performed.

13. The non-transitory machine-readable medium of claim 12, wherein the setting the plurality of light sources to the first display configuration comprises transitioning the plurality of light sources from the second display configuration to the first display configuration when the first action is not performed successfully.

14. The non-transitory machine-readable medium of claim 9, the preset sequence of action further comprising a second action, wherein the operations further comprise:

transitioning the plurality of light sources from the first display configuration to a second display configuration of the plurality of display configurations when the first action is performed successfully; and maintaining the plurality of light sources at the second display configuration when the second action is being performed.

\* \* \* \* \*